June 2, 1964 C. R. KENNY ETAL 3,135,928

TETRODE PULSE SHAPING CIRCUIT

Filed Dec. 26, 1961

INVENTORS
CHARLES R. KENNY
JOHN D. FACKLER

BY H. L. Mackey
ATTORNEY

United States Patent Office 3,135,928
Patented June 2, 1964

3,135,928

TETRODE PULSE SHAPING CIRCUIT

Charles R. Kenny, Purdy's Station, and John D. Fackler, Bedford, N.Y., assignors to General Precision, Inc., a corporation of Delaware Filed Dec. 26, 1961, Ser. No. 161,861
2 Claims. (Cl. 331—87)

This invention relates to pulse generating circuits wherein a rectangular current pulse is applied to a reactive load, and particularly to shaping circuits used in connection therewith which rapidly terminate the current pulse.

Pulse generators are well known and they ordinarily include generators in which an inductor is first charged through a switch, applying voltage to the load, and then by opening the switch, removing voltage from the load, and discharging the inductor. Primarily, this constitutes a unilateral switching device. When the load contains a storage element, such as a capacitor, the removal of voltage from the load proceeds at a rate determined solely by the resonant characteristics of the inductor and the capacitance of the load. In order that the voltage may be rapidly removed from the load, a second switch may be added. This addition then constitutes a bilateral switching device. The present invention involves a particular form of such a bilateral switching circuit.

An example of a reactive load through which a rectangular current pulse should be passed is the familiar microwave magnetron widely used in radar equipment. In such equipment a rectangular timing voltage pulse is applied to a pulse generating circuit which in turn applies a rectangular voltage pulse to the magnetron, causing a current pulse to flow through it to generate a pulse of microwave energy. The energy is transmitted to an antenna, which radiates into space. The radiations are reflected and received by a microwave receiver. The receiver is "gated off" during transmission of each pulse and should be "gated on" as soon as possible after each pulse in order to receive echoes for as large a portion of the cycle as possible.

Ideally, the starting and stopping of the generation of oscillations by the magnetron should be coincident with the leading and trailing edges, respectively, of the rectangular voltage timing pulse applied to the pulse generating circuit and of the voltage pulse applied thereby to the magnetron. If so, the receiver-off time can be limited to the duration of these pulses. However, in practice the magnetron may continue to oscillate for a substantial period of time after the cessation of the rectangular voltage timing pulse applied to the pulse generator. This continued oscillation occurs because the stray capacitance which has become charged, discharges through the magnetron after termination of the current from the pulse generator. This stray capacitance consists of the magnetron interelectrode capacitance, the interelectrode capacitance of the restorer diode tube and the distributed capacitance, both mutual and to ground, of associated wiring. This stray capacitance discharge prolongs the generation of oscillations, even down to a very low potential, such as 50 volts across the magnetron, and makes it necessary to extend the receiver-off time considerably beyond the termination of the timing pulse.

In the past it has been possible to quench the magnetron oscillations quickly by shunting the magnetron and the stray capacitance with a triode tube circuit, for example, as described in U.S. Patent No. 2,885,554. This triode tube is arranged to be nonconductive during the transmitting pulse but highly conductive immediately thereafter, thus absorbing the stray capacitance discharge energy with great speed.

It has been found, however, that the use of a tetrode tube to shunt the magnetron has important advantages over the use of a triode and results in a further material reduction of the "tail," or remanent microwave generation, after the timing voltage pulse has ended. This advantage of the tetrode results from the inherently higher upper frequency limit of a tetrode, permitting the time constant of the associated pulse transformer to be reduced. Additionally, a tetrode requires less drive current and its cutoff voltage characteristic is inherently sharper than that of a triode.

However, a tetrode has such characteristics as to prevent its direct substitution in a conventional manner in a circuit such as that of the above patent. A new and novel circuit has been devised which permits use of a tetrode in place of the triode shunting tube. This new circuit constitutes the present invention.

One object of this invention is to cause a substantially rectangular pulse of current to traverse a reactive load.

Another object of this invention is to counteract the effects of a reactance of a load circuit to which pulses are applied.

A more specific object of the invention is to reduce the time required to terminate the operation of a magnetron oscillator.

Another object of the invention is to make the shape of the envelope of the oscillations of a magnetron more nearly rectangular.

Another object of the invention is to render a magnetron operative for a period of time substantially no greater than the duration of a timing voltage pulse applied from a pulse generating circuit to the magnetron.

Another object of the invention is to reduce the operating voltage between the electrodes of a magnetron to zero quickly.

Another object of the invention is to employ a tetrode tube in shunt with a magnetron, holding the shunt tetrode nonconductive during pulsing of the magnetron and making the shunt tetrode conductive at the trailing edge of the voltage pulse applied to the magnetron.

A further understanding of this invention may be secured from the detailed description and associated drawings, in which.

Figure 1:
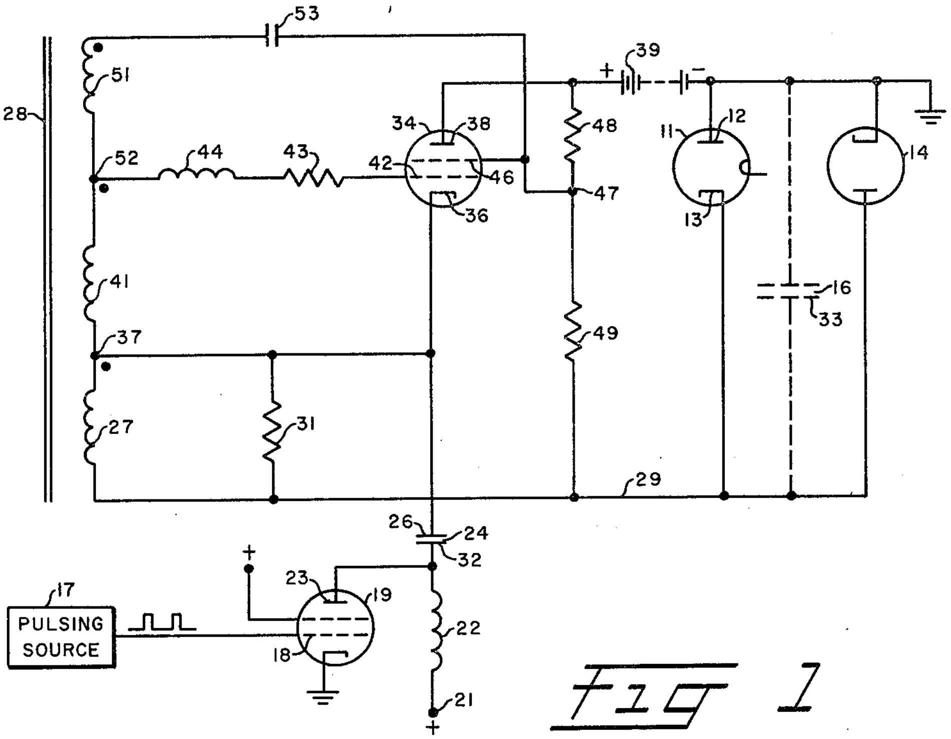
FIGURE 1 is the schematic circuit of an embodiment of the invention.

Referring now to FIGURE 1, there is shown a magnetron 11 having a grounded anode 12 and a cathode 13. The magnetron is shunted by a diode restorer tube 14. The magnetron circuit has associated with it stray capacitance 16, having perhaps the considerable magnitude of 40$\mu\mu$f. It is the discharge of the energy of this stray capacitance through the magnetron which causes continued oscillation after pulse energization has been terminated, and which the circuit of this invention is intended to prevent.

A source 17 of a train of rectangular voltage pulses is connected for periodic positive excitation of the control grid 18 of a pulser tube 19, this tube being nonconductive between pulses. A source of positive, direct-current, continuous potential is represented by the terminal 21. It is connected through a pulsing inductor 22 to the pulser tube anode 23 and also to one plate of a pulsing capacitor 24. The source potential is +4000 volts, the inductance of the inductor 22 is 200 mh. and the capacitance of capacitor 24 is 0.01 $\mu$f. The other plate 26 of capacitor 24 is connected through one winding 27 of a pulse transformer 28 and conductor 29 to the cathode 13 of the magnetron 11. The grounded anode 12 is returned to the other terminal of the 4000-volt source. The winding 27 is shunted by a 500-ohm resistor 31, the purpose of which is to help dissipate energy when the charge of the stray capacitance 16 flows through the resistor and the winding 27 in parallel. The pulse transformer 28 has the characteristic that it will transmit a desired range of pulse widths. Pulse widths up to, perhaps, 4 $\mu$s, or as wide as may be required in the pulse train from the source 17, must be transmitted. In order to accomplish the purpose of this invention narrow pulse widths, corresponding to the permissible "tail" oscillation after the pulse trailing edge of perhaps 0.1 or 0.2 $\mu$s, must be transmissible through the pulse transformer 28.

Figure 2:
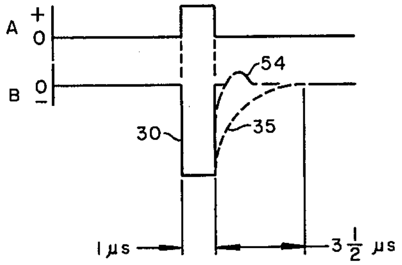
FIGURE 2 depicts graphs showing operation of the circuit.

In the absence of any device for quenching the magnetron oscillations caused by the discharge of the stray capacitance 16, and ignoring the pulse transformer 28, the conventional pulsing circuit as so far described operates as follows. Assume that the plate 26 of capacitor 24 is initially at ground potential and that the tube 19 is nonconductive. A positive pulse from the timing source 17 renders the tube 19 conductive, suddenly driving the plate 32 of capacitor 24 to ground potential, which causes the plate 26 to drop to minus 4000 volts. This potential immediately causes current flow and the charge of capacitor 24 begins to discharge through the winding 27 in shunt with resistor 31, and through conductor 29 and magnetron 11 to ground, causing the magnetron to oscillate vigorously. When the pulse from source 17 is ended the tube 19 again regains its nonconductivity. The capacitor 24 will cease discharging and, as the inductor 22 instantaneously again applies +4000 volts to plate 32, the capacitor 24 starts to recharge endeavoring to bring the potential of plate 26 from minus 4000 volts to zero volts. The rate of change of this voltage at plate 26, at cathode 13 and across stray capacitance 16 is dependent upon the natural frequency of resonance of the inductor 22 taken together with the stray capacitance 16. The magnetron 11 is capable of generating microwave oscillations not only when −4000 volts are impressed on it, but also at far lower potentials, down to and below minus 50 volts. Thus, weakening microwave oscillations are generated for some 3½ $\mu$s after the excitation from the pulsing capacitor 24 has ended. This is shown by the graph of FIGURE 2. A single pulse of positive excitation of the grid 18 is shown by the graph A. The resulting pulse of potential, applied to the magnetron to a different scale, is shown in graph B by the rectangular form 30. The relatively very gradual discharge of the stray capacitance, substantially terminated after 3½ $\mu$s, is shown by the dotted line 35.

The restorer tube 14 keeps the potential of conductor 29 from rising materially above ground potential. Therefore, when the pulser tube 19 is nonconductive and the potential of plate 32 of capacitor 24 abruptly jumps from zero to +4000 volts, plate 26 and cathode 13 of the magnetron 11 are prevented from rising materially above zero volts as they would otherwise do, due to the resonance of inductor 22 with capacitor 16.

In order to reduce the time required to terminate the oscillation of the magnetron 11, this invention employs a tetrode tube 34 having its cathode 36 connected to the junction 37 of transformer 28. The anode 38 is connected to the positive terminal of a potential source 39 which has its negative terminal connected to the magnetron anode 12. A second winding 41 of the pulse autotransformer 28 is connected between the cathode 36 of the tetrode 34 and its control grid 42. In series with this grid 42 are placed a low resistance protective resistor 43 and a peaking inductor 44 which has the function of increasing the abruptness of pulse termination. The screen grid 46 is connected to the junction 47 of a voltage divider consisting of resistors 48 and 49 connected between the anode 38 and conductor 29. A tertiary winding 51 of the pulse transformer 28 is connected at one end to the junction 52 with the secondary winding 41 and at the other end is coupled by the relatively large capacitor 53 to the screen 46. The three transformer windings, 27, 41 and 51 are connected in series aiding, as indicated by the dots associated with these windings.

In the operation of this circuit, let it be supposed that initially, before the application of a pulse from the pulsing source 17, the pulser tube 19 is nonconductive, the plate 32 of capacitor 24 is at +4000 volts, and the cathode 13 of the magnetron 11 is at approximately ground or zero potential. The tetrode anode 38 is at the +300 volts potential of battery 39 relative to its cathode 36 and only a very small current flows through tetrode 34, resistor 31, and restorer diode 14 because of the low or zero screen and control grid potentials.

Upon delivery of a positive pulse by source 17 to grid 18, pulse tube 19 becomes conductive and places plate 32 at ground potential, causing a minus 4000-volt pulse of potential to be applied from plate 26 to the magnetron cathode 13. The magnetron conducts, and its current flows through winding 27 causing junction 37 to become negative relative to conductor 29. This induces a high negative potential at junction 52 relative to junction 37, causing the control grid 42 and the screen grid 46 both to become highly negative relative to the cathode 36 which causes the tetrode 34 to be cut off and become nonconductive even though its cathode is at −4000 volts and its anode is at +300 volts. The same minus 4000-volt potential applied from the charge of capacitor 24 to the magnetron 11 also charges the plate 33 of stray capacitance 16 to minus 4000 volts.

When the charging potential from capacitor 24 is terminated, the stray capacitance 16 begins to discharge. However, the charging potential which caused current in winding 27 now being terminated, the control grid 42 is no longer held highly negative but returns to the potential of cathode 36. A small current, under the pressure of the −4000 volt potential of the stray capacitance, now begins to flow from conductor 29 through winding 27 and the anode 38 of tetrode 34 to ground. This current is in such direction in winding 27, opposite to its previous direction, as to induce a positive potential at junction 52 and at control grid 42, making the tetrode conductive. This action is aided by induction to the winding 51 so as to couple, through capacitor 53, positive potential to the screen grid 46. This latter action is so regulated as to make the tetrode fully conductive yet not to make the screen more positive than the anode, which would change the tube characteristics to make it less effective. The tetrode 34 thus becomes a relatively low-resistance short circuit across the stray capacitance 16, draining its charge in a small fraction of a microsecond. In the process of discharging the stray capacitance, resistance is met principally in the resistor 31 and the anode-cathode circuit of the tetrode 34, so that the energy of the discharge is dissipated principally at these two places. When all of the stray capacitance charge has been drained, current flow through the transformer winding 27 ceases and the control grid 42 returns to zero potential relative to its cathode 36.

The function of the local source exemplified by the battery 39 may be explained by first supposing its absence and assuming that the anode 38 is connected directly to the magnetron anode 12. The screen 46 should be held positive relative to its cathode but yet considerably more negative than its anode 38 for proper functioning of the tetrode. Then, in discharging the stray capacitance 16, the tetrode cannot discharge the capacitance to its anode voltage but only to that of its screen. Thus, the short-circuiting discharge of the stray capacitance is effected only down to some 300 volts, after which the stray capacitance must discharge through the magnetron, keeping it oscillating. To remedy this, the battery 39 is employed. To prevent making the screen more positive than the anode the battery is connected to both screen and anode. Thus, when the potential of the cathode 36 is brought to within 300 volts below the screen potential as enhanced by the output of winding 51, the cathode potential has been brought to approximately the ground potential of the magnetron anode 12 and the stray capacitance 16 has been fully discharged. The discharge tail is thus confined to a small fraction of a microsecond duration, as indicated by the dashed line 54, FIGURE 2.

What is claimed is:

1. A source of pulsed microwave oscillations comprising, a magnetron, a capacitor, a pulse autotransformer having first, second and third windings, a charging circuit for said capacitor comprising a voltage source, an inductor, said capacitor, said first winding of the transformer and a resistor paralleled therewith; a first electronic tube having a cathode, an anode and a control electrode, said first tube being adapted to be rendered conductive periodically by the application of a pulse train to its control electrode, a discharge circuit for said capacitor comprising said capacitor, said first winding, said magnetron, and the cathode-anode circuit of said first tube, a second electronic tube having a cathode, an anode, a control electrode and a screen electrode, a battery, an auxiliary circuit connected in parallel with said magnetron, said auxiliary circuit including the anode-cathode circuit of said second tube, said first winding and said battery, means connecting the second winding of said autotransformer to excite the control electrode of said second tube and means connecting the third winding of said autotransformer to excite said screen electrode of the second tube.

2. A source of pulsed microwave oscillations comprising; a magnetron, a capacitor; a transformer having first, second and third windings; a charging circuit for said capacitor including a voltage source, an inductor, said capacitor and said first winding all connected in series with a resistor connected in parallel to said first winding; a first discharge tube including a cathode, anode and control electrode, said first discharge tube being rendered periodically conductive by the application of a pulse train to its control electrode; a discharge circuit for said capacitor including said capacitor, said first winding, said magnetron and the cathode-anode path of said first tube all connected in series; a second discharge tube having cathode, anode, control grid and screen grid electrodes; an auxiliary circuit connected in parallel with said magnetron, said auxiliary circuit including the cathode-anode circuit of said second tube and said first winding; said second winding being connected between the cathode and control grid of said second tube, said third winding being connected between the control grid and screen grid of said second tube, said second and third windings being so poled with respect to said first winding as to render said second tube nonconductive during periods of discharge of said capacitor; a voltage divider circuit connected between the anode of said second tube and the end of said first winding remote from the end connected to the cathode of said second tube, said screen grid being connected to an intermediate terminal of said voltage divider circuit; and a potential source connected between the anode of said second tube and the anode of said magnetron.

References Cited in the file of this patent

UNITED STATES PATENTS

| | | |
|---|---|---|
| 2,694,144 | Brustman | Nov. 9, 1954 |
| 2,730,621 | Hellings et al. | Jan. 10, 1956 |
| 2,885,554 | Kenny | May 5, 1959 |